United States Patent
Wu (10) Patent No.: US 7,817,595 B2
(45) Date of Patent: Oct. 19, 2010

(54) COMMUNICATION SYSTEM, USER DEVICE THEREOF AND SYNCHRONIZATION METHOD THEREOF

(75) Inventor: Chih-Hsiang Wu, Tao Yuan (TW)

(73) Assignee: HTC Corporation, Taoyuan (TW)

( * ) Notice: Subject to any disclaimer, the term of this patent is extended or adjusted under 35 U.S.C. 154(b) by 671 days.

(21) Appl. No.: 11/749,756

(22) Filed: May 17, 2007

(65) Prior Publication Data

US 2008/0285538 A1 Nov. 20, 2008

(51) Int. Cl.
*H04W 4/00* (2009.01)
(52) U.S. Cl. ....................................... 370/328
(58) Field of Classification Search ............... 455/410, 455/411; 370/328
See application file for complete search history.

(56) References Cited

U.S. PATENT DOCUMENTS

| | | | | |
|---|---|---|---|---|
| 6,961,570 B2 * | 11/2005 | Kuo et al. | ................... | 455/436 |
| 6,980,795 B1 * | 12/2005 | Hermann et al. | ............. | 455/410 |
| 7,254,143 B2 * | 8/2007 | Jiang | .......................... | 370/469 |
| 7,471,943 B2 * | 12/2008 | Chun et al. | .................. | 455/410 |
| 2003/0100291 A1 * | 5/2003 | Krishnarajah et al. | ....... | 455/410 |
| 2004/0180675 A1 * | 9/2004 | Choi et al. | ................... | 455/458 |
| 2005/0036619 A1 * | 2/2005 | Funnell et al. | .............. | 380/256 |
| 2005/0086466 A1 | 4/2005 | Funnell et al. | | |

FOREIGN PATENT DOCUMENTS

EP 1337125 8/2003

OTHER PUBLICATIONS

"Universal Mobile Telecommunications System (UMTS); Radio Resource Control (RRC) protocol specification (3GPP TS 25.331 version 3.21.0 Release 1999); ETSI TS 125 331" ETSI Standards, LIS, Sophia Antipolis Cedex, France, vol. 3-R2, No. V3.21.0, Dec. 1, 2004, XP014027667 ISSN: 000-0001, Paragraphs [8.1.12] & [8.6.3.4].

* cited by examiner

*Primary Examiner*—Lester Kincaid
*Assistant Examiner*—Nathan Mitchell
(74) *Attorney, Agent, or Firm*—IPR Works, LLC (57) ABSTRACT

A communication system, user device thereof, and a synchronization method thereof are provided. The communication system includes a user device and a wireless network. A ciphering configuration information is transmitted to a user device. The user device and wireless network re-establishing the radio link control (RLC) entity of logical link. The user device changes to the new ciphering configuration immediately following the re-establishment of RLC entity according to the received ciphering configuration information and the wireless network changes to the new ciphering configuration.

15 Claims, 6 Drawing Sheets

COMMUNICATION SYSTEM, USER DEVICE THEREOF AND SYNCHRONIZATION METHOD THEREOF

BACKGROUND OF THE INVENTION

1. Field of the Invention

The present invention generally relates to a synchronization method of communication, in particular, to a synchronization method adapted to be employed in the third generation mobile communication system for decreasing the call-dropping probability thereof.

2. Description of Related Art

With the arrival of the information era, demands for mobile audio, data communication, and kinds of mobile service are continuously increasing. Limited communication channels and insufficient transmission speed deter the concurrent communication system to be further developed. Therefore, the third generation mobile (3G) mobile communication, capable of providing higher frequency band utilizing efficiency and faster transmission service, has been developed accordingly.

Figure 1:
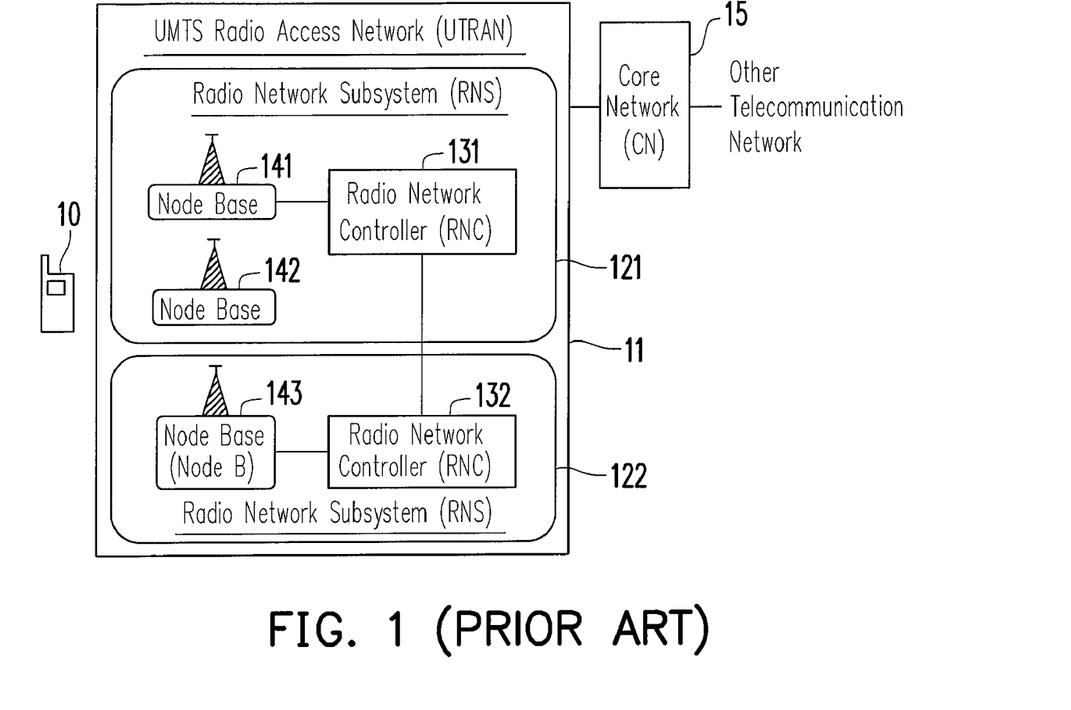
FIG. 1 is a schematic diagram for illustrating a 3G mobile communication network.

FIG. 1 is a schematic diagram for illustrating a 3G mobile communication network. Referring to FIG. 1, a user equipment (UE) 10, e.g., a cellular phone or one of other handheld communication devices, communicates to a universal mobile telecommunication system radio access network (UTRAN) 11 via radio signals. The UTRAN 11 includes several radio network subsystems (RNS) 121, 122. Each of the RNSs is controlled by a radio network controller (RNC) 131, 132. Each RNC is connected with a plurality of node bases (Node B) 141-143. For example, as shown in FIG. 1, the RNS 121 includes RNCs 131 and Node Bs 141, 142, and the RNS 122 includes RNCs 132 and a Node B 143. The UTRAN 11 communicates with other telecommunication network, e.g., internet, via a core network (CN) 15 to provide 3G audio and/or data transmission service.

If moved or the wireless environment is changed, the UTRAN may shift UE among different RNSs, e.g., changing from connection to the RNS 121 to connect to the RNS 122. Such a procedure is called serving radio network subsystem (SRNS) relocation. In such a procedure, the UE 10 and the UTRAN 11 have to communicate to each other by synchronously using identical setting configuration. For example, the UE 10 and the UTRAN 11 must synchronously use data cipher corresponding to a new setting configuration to encrypt or decrypt the data.

Figure 2:
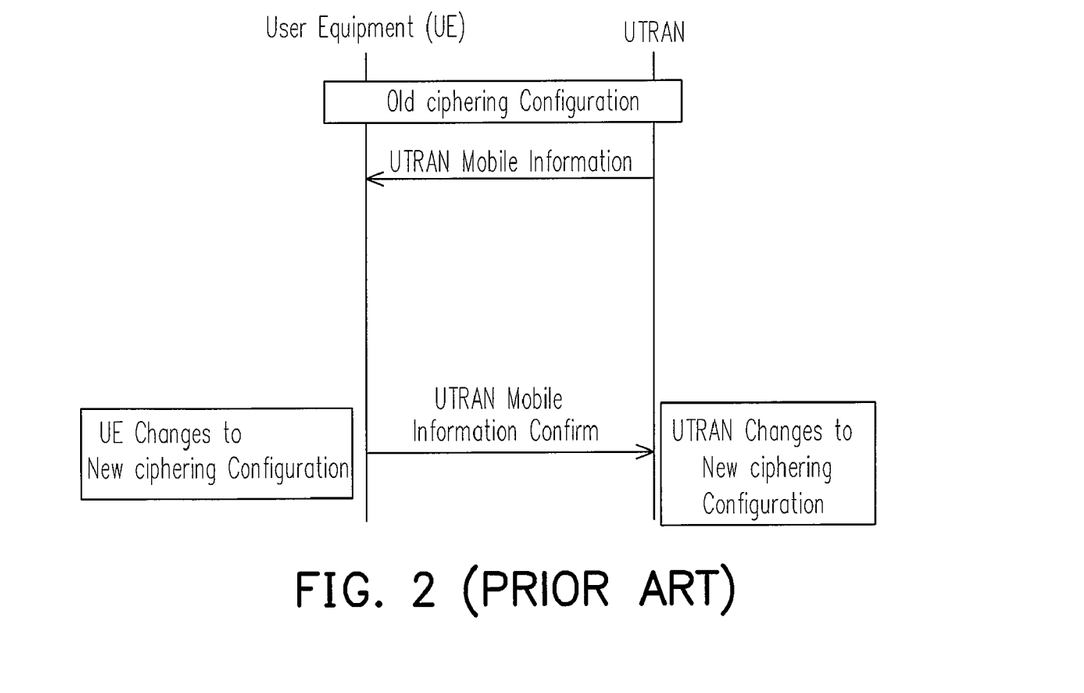
FIG. 2 is a schematic diagram for illustrating the 3G mobile communication synchronization between a UE and a UTRAN.

FIG. 2 is a schematic diagram for illustrating the 3G mobile communication synchronization between a UE and a UTRAN. Referring to FIGS. 1 and 2, in an SRNS relocation procedure, the UTRAN transmits a radio resource control (RRC) message containing ciphering configuration information. After receiving the RRC re-configuration message containing the ciphering configuration information, the UE changes to the corresponding new ciphering configuration and transmits RRC response message to the UTRAN. For example, the UTRAN transmits a UTRAN mobility information RRC message containing downlink counter synchronization information to the UE. After receiving the aforementioned RRC message, the UE changes to the new configuration and feeds back a UTRAN mobility information confirm RRC message to respond the reception of the RRC message.

Because of the standard of 3G mobile communication, the UE is setup to measure e.g. wireless channel, according to which the RNC performs and controls channel source management. The obtained results also depend on the adjustment of the wireless channel quality factors for maintaining quality of different services. Therefore, the UE transmits a measurement report at predetermined times to the UTRAN according to the measurement event or the standard. However, the 3G mobile communication standard does not clearly define when the UTRAN should use its corresponding new ciphering configuration. As such, the UTRAN cannot correctly use the same data cipher of the UE to encode or decode the data, which is illustrated with reference to FIG. 4 as follows.

Figure 3:
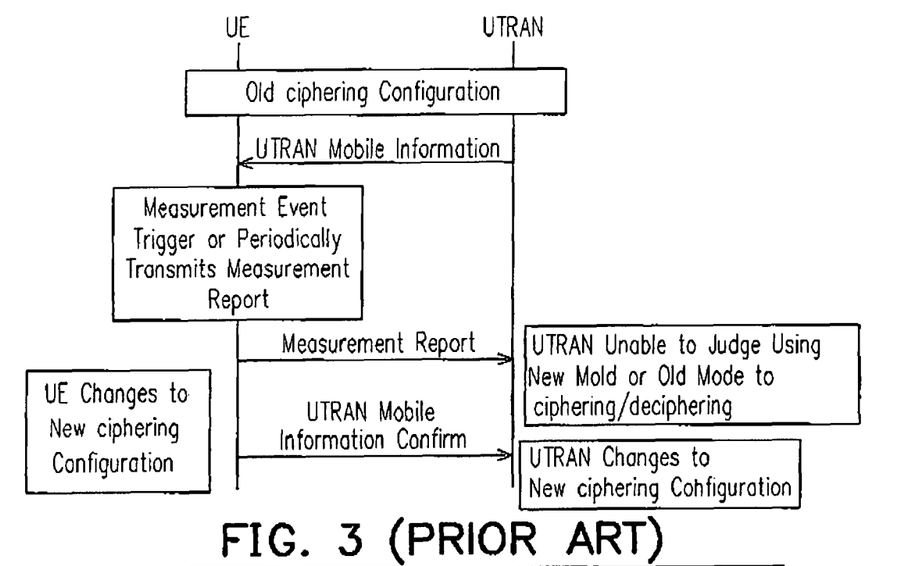
FIG. 3 is a schematic diagram for illustrating incorrectly encrypting/decrypting due to a synchronization failure between the UE and the UTRAN of 3G mobile communication.

FIG. 3 is a schematic diagram for illustrating incorrectly encrypting/decrypting due to a synchronization failure between the UE and the UTRAN of 3G mobile communication. At the beginning, the UTRAN transmits UTRAN mobility information RRC message containing downlink counter synchronization information and ciphering mode info containing new ciphering configuration to the UE. However, after receiving the aforementioned RRC message, the UE most probably sends measurement reports to the UTRAN at predetermined times triggered by measurement event or following the standard, before changing to the new ciphering configuration and feeds back a UTRAN mobility information confirm. In such a way, the UE will use the old configuration to transmit the measurement report. Unfortunately, if the UTRAN has already used the new ciphering configuration to receive the measurement report, the UE and the UTRAN is unsynchronized, thus causing incorrectly data encrypting/decrypting of the two parties. Affections of the incorrectly data encrypting/decrypting are illustrated below with reference to FIG. 4.

Figure 4:
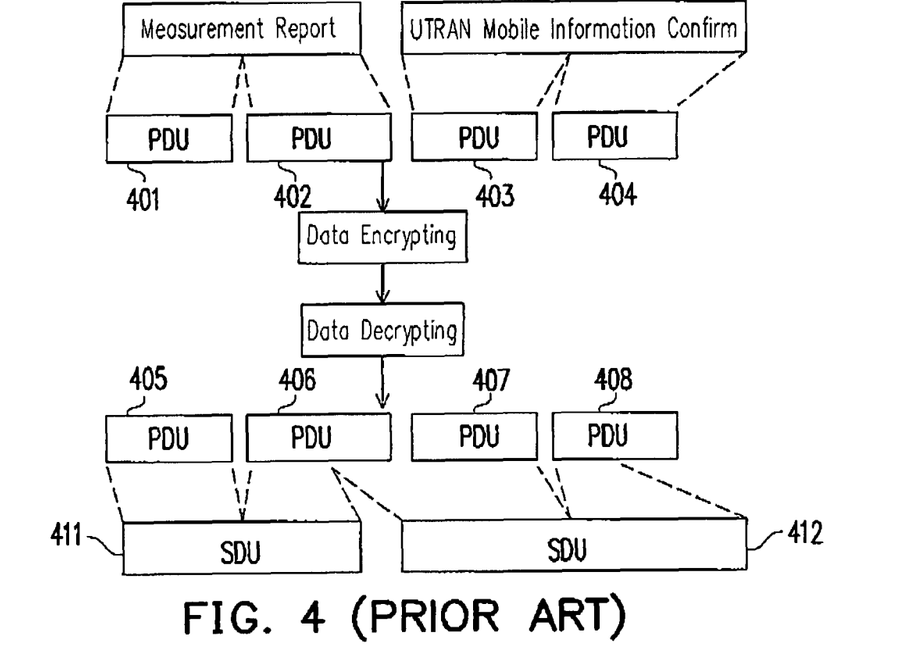
FIG. 4 is a schematic diagram for illustrating incorrect data encrypting/decrypting of the UE and the UTRAN.

FIG. 4 is a schematic diagram for illustrating incorrectly data encrypting/decrypting of the UE and the UTRAN. Referring to FIG. 4, it is assumed that the measurement report transmitted by the UE is composed of protocol data units (PDUs) 401-402, while the UTRAN mobility information confirm is composed of PDUs 403-404 of the RLC entity. If the data are asynchronously encrypted/decrypted, the UTRAN would decrypt the received PUDs 405-408 into incorrect service data unit (SDU), e.g., SDU 411 and SDU 412 which would not form RRC messages. The measurement report includes measurement values of the wireless connection, and the UTRAN can select exchanging cells according to the measurement values. Most importance of all, the new configurations of data cipher between UE and UTRAN are not synchronous any more and the old configuration cannot be changed back. Therefore, the call-dropping probability is increased.

SUMMARY OF THE INVENTION

Accordingly, the present invention is directed to a synchronization method for a communication system. The synchronization method is adapted to ensure, in a system relocation procedure, a user device and a wireless network thereof to synchronously transmit data with a same configuration, thus avoiding data encrypting/decrypting errors, reducing transmission failure, and decreasing the call-dropping probability thereof.

The present invention is directed to provide a user device. In a system relocation procedure, the user device according to the present invention can be guaranteed to be synchronized with a wireless network to transmit data in a same configuration. In such a way, data encrypting/decrypting operation can be more reliable, and the transmission arrival rate and call sustaining rate are enhanced.

The present invention is directed to provide a communication system. In a system relocation procedure, a user device and a wireless network thereof to be synchronized with each other to transmit data in a same configuration can be ensured.

In such a way, data encrypting/decrypting operation can be more reliable, and the transmission arrival rate and call sustaining rate are enhanced.

The present invention is directed to a synchronization method for a communication system. The synchronization method includes: transmitting a RRC re-configuration message containing ciphering configuration information to a user device using a wireless network; re-establishing the radio link control (RLC) entity of logical link; changing to the new ciphering configuration immediately following the re-establishment of RLC entity according to the received ciphering configuration information using the UE; changing to the new ciphering configuration using the wireless network.

According to an embodiment of the present invention, the UE includes a receiving/transmitting unit and a synchronization control unit. The receiving/transmitting unit is adapted for receiving/transmitting electronic information. The synchronization control unit is coupled to the receiving/transmitting unit. When the receiving/transmitting unit receives a RRC re-configuration message containing ciphering configuration information from a UTRAN, the synchronization control unit controls the receiving/transmitting unit to re-establish the radio link control (RLC) entity of logical link; the receiving/transmitting unit changes to a new ciphering configuration according to the received ciphering configuration information.

The present invention is directed to a ciphering configuration synchronization method for a communication system. The synchronization method includes: transmitting a RRC re-configuration message containing ciphering configuration information to a UE using a UTRAN; suspending transmission of messages on logical link using the UE after receiving the ciphering configuration information; changing to the new ciphering configuration according to the received ciphering configuration information using the UE; changing to the new ciphering configuration using the UTRAN; and resuming the transmission of messages on logical link after transmitting a RRC response message to respond the RRC re-configuration message.

The present invention is also directed to a communication system. According to an embodiment of the present invention, the communication system includes a wireless network and a user device. The wireless network and the user device are adapted for transmitting/receiving electronic information one to another. When the user device receives a RRC re-configuration message containing a ciphering configuration information from the wireless network, the user device suspends transmission of the electronic information on logical link; the user device then changes to a new ciphering configuration according to the ciphering configuration information; then the user device resumes the transmittance of electronic information.

According to the present invention, upon receiving the ciphering configuration information, the user device suspends transmission of the electronic information, then changes to a new configuration according to the ciphering configuration information, the wireless network changes to the new configuration, and after changing to the new configuration, the user device resumes transmission of the electronic information. Thus, reducing transmission failure and decreasing the call-dropping probability thereof.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts. The present invention can be applied to any communication system. In the following embodiments, the present invention is applied to the third generation (3G) mobile communication system.

For failing to clearly define a time at which the user device and the wireless network use a new configuration (e.g. new ciphering configuration), conventional art often fail to synchronize the ciphering configurations of the user device and the wireless network during a system relocation procedure, which is likely to increase the system transmission failure rate and the call-dropping probability thereof. For solving the aforementioned problem of the conventional art, the present invention provide a scheme and/or a method for synchronizing a communication system, in that the user device and the wireless network, when need to perform a system relocation procedure, can be synchronously refreshed to a new ciphering configuration, and thereby reduce the transmission failure rate and the call dropping probability associated therewith.

Figure 5:
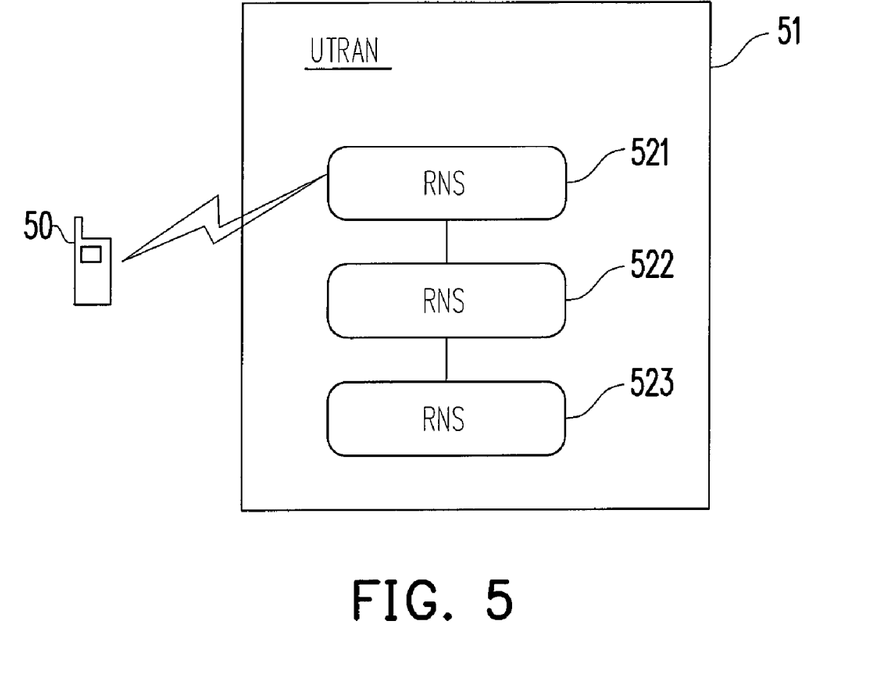
FIG. 5 is a diagram illustrating a communication system according an embodiment of the present invention.
Figure 6:
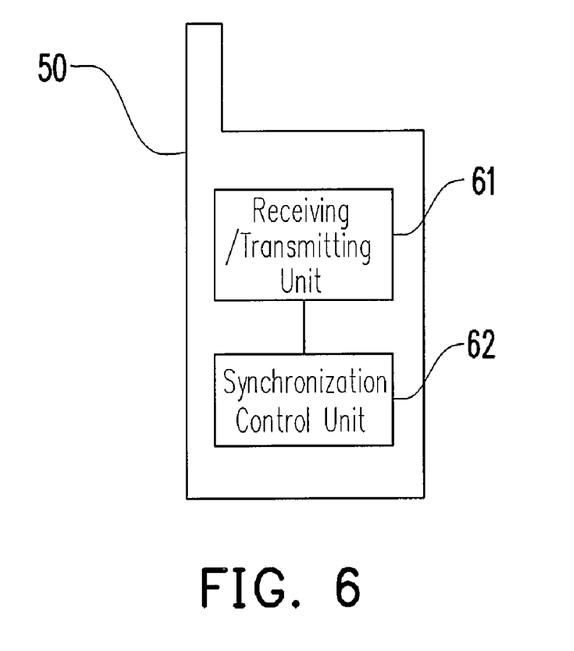
FIG. 6 is a circuit diagram for illustrating a UE 50 according an embodiment of the present invention.

FIG. 5 is a diagram illustrating a communication system according an embodiment of the present invention. Referring to FIG. 5, a communication system according to an embodiment of the present invention includes a user device (e.g. UE 50 in 3G system) and a wireless network (e.g. UTRAN 51 in 3G system). The UTRAN 51 includes a plurality of subsystem (e.g. RNS 521-523 in 3G system). The UTRAN 51 provides radio access service to the UE 50. The UE 50 and the UTRAN 51 communicate with each other by transmitting/receiving electronic information there between. FIG. 6 is a circuit diagram for illustrating a UE 50 according an embodiment of the present invention. Referring to FIG. 6, the UE 50 of the present embodiment includes a transmitting/receiving unit 61 and a synchronization control unit 62. The synchronization control unit 62 is coupled to the transmitting/receiving unit 61 for controlling a configuration (e.g. ciphering configuration) of the UE 50. It should be noted that in the present embodiment, details of the transmitting/receiving unit 61, e.g., antenna, modulator, encoder/decoder is not described as those of ordinary skill in the art may be easily construct such a transmitting/receiving unit 61 in accordance with the practical demand. Details of the present embodiment are discussed below with reference to FIGS. 5 and 6.

In this embodiment, when a system relocation (e.g. SRNS relocation in 3G system) procedure is initiated, the UTRAN 51 transmits a RRC re-configuration message containing a ciphering configuration information. The transmitting/receiving unit 61 of the UE 50 then receives the ciphering configuration information. The synchronization control unit 62 controls the transmitting/receiving unit 61 to suspend transmission of messages on logical link, e.g. radio bearer (RB2) in 3G system, and thereafter changes the ciphering configuration of the transmitting/receiving unit 61 according to the ciphering configuration information. The receiving/transmitting unit 61 transmits a RRC response message to respond the RRC re-configuration message to the wireless network on the logical link. The RB2 is a kind of logical link for signaling, i.e. RRC messages in 3G UMTS system. Data (e.g. voice, TCP/IP packets) and signaling messages are multiplexed in physical layer. After the transmitting/receiving unit 61 changes to a new ciphering configuration, the synchronization control unit 62 then controls the transmitting/receiving unit 61 to resume transmission of the electronic information. In such a way, the UE 50 and the UTRAN 51 can communicate with each other by new ciphering configurations corresponding to each other. Furthermore, the transmitting/receiving unit 61 can also be subject to feed back an acknowledgement message to the UTRAN 51 after receiving the ciphering configuration information, and thereafter the ciphering configuration of the UTRAN 51 is changed according to the ciphering configuration information after the acknowledgement message is received. Wherein, the acknowledgement message is, for example, a RLC acknowledgement message in 3G UMTS system. This way, the synchronous communication with the new ciphering configuration between the UE 50 and the UTRAN 51 can be ensured.

For purpose of simplification, legends of below discussed drawing have been abbreviated, for example the UE discussed below is designated as the same of the UE 50 of FIG. 5, and the UTRAN is designated as the same of UTRAN 51 of FIG. 5.

Figure 7:
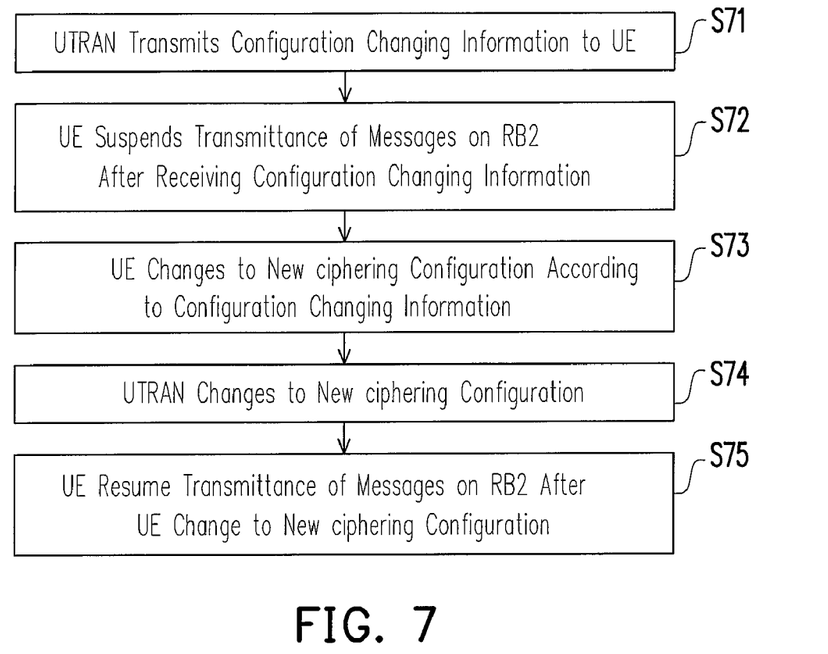
FIG. 7 is a flow chart for illustrating a synchronization method of the communication system according to an embodiment of the present invention.

FIG. 7 is a flow chart for illustrating a synchronization method of the communication system according to an embodiment of the present invention. Referring to FIG. 7, first, at step S71, the UTRAN transmits a RRC re-configuration message containing ciphering configuration information to the UE. Next, at step S72, after the UE receives the ciphering configuration information, the UE suspends transmission of the electronic information on RB2. Next, at step S73, the UE changes to a new ciphering configuration according to the ciphering configuration information. Next, at step S74, the UTRAN changes to the new ciphering configuration. Finally, at step S75, after the UE changes to the new ciphering configuration, the UE resumes to transmit the electronic information.

Figure 8:
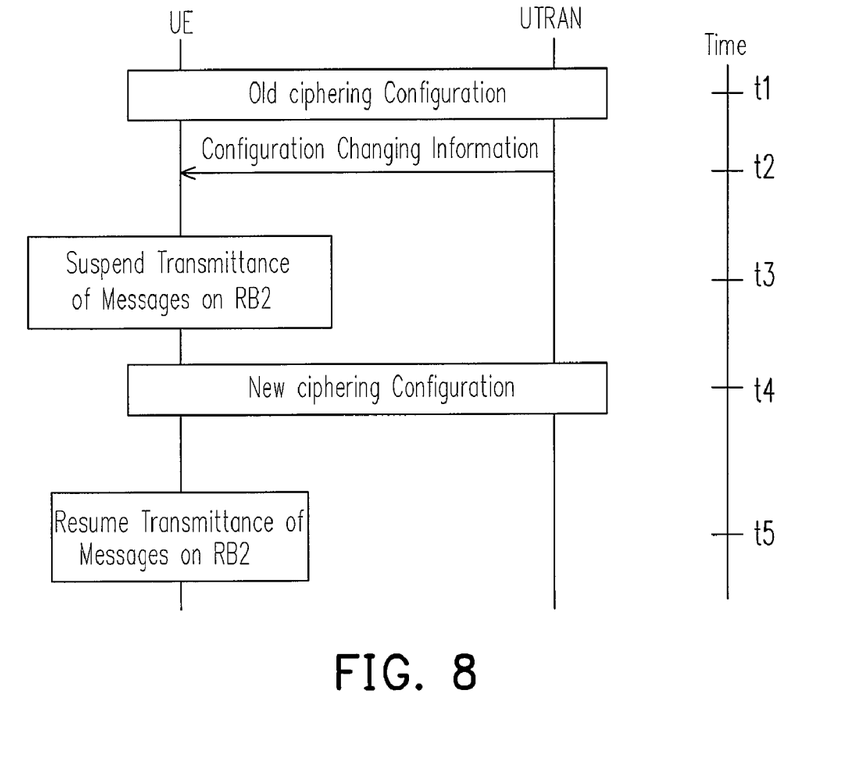
FIG. 8 is a schematic diagram for illustrating a synchronization method of the communication system according to an embodiment of the present invention.

FIG. 8 is a schematic diagram for illustrating a synchronization method of the communication system according to an embodiment of the present invention. Referring to FIGS. 7 and 8, a preferred time for initiating the synchronization method according to the embodiment of the present invention is the time that the UE needs to change an RNS in connection with the UTRAN in an SRNS relocation procedure. At the beginning, i.e., time t1, both of the UE and the UTRAN use an old ciphering configuration, e.g., using data cipher corresponding to the old ciphering configuration to encrypt/decrypt. As the SRNS relocation procedure starts, the UTRAN transmits a RRC re-configuration message containing ciphering configuration information to the UE, as illustrated at time t2 of FIG. 8 (step S71) as illustrated in FIG. 7. According to the current standard, the UTRAN can select any RRC re-configuration message, such as RADIO BEARER SETUP message, RADIO BEARER RELEASE message, TRANSPORT CHANNEL RECONFIGURATION message, PHYSICAL CHANNEL RECONFIGURATION message, CELL UPDATE CONFIRM message, URA UPDATE CONFIRM message, or UTRAN MOBILITY INFORMATION message, to transmit a downlink counter synchronization information and ciphering mode info as ciphering configuration information to make UE perform SRNS relocation. The UTRAN can also employ other RRC message, such as RADIO BEARER RECONFIGURATION message to transmit new UTRAN radio network temporary identity (new U-RNTI) information and ciphering mode info as ciphering configuration information to make UE perform SRNS relocation.

When the UE receives the aforementioned ciphering configuration information, the UE suspends transmission of the messages on RB2 (step S72) as illustrated in FIG. 7. At the time t3, as illustrated in FIG. 8, transmission of a measurement report according to the measurement event or the aforementioned standard is suspended. Next, at step S73, the UE changes to the new ciphering configuration on RB2 according to the ciphering configuration information as illustrated in FIG. 7 at the time t4 as illustrated in FIG. 8. The UTRAN changes to the new ciphering configuration on RB2 (step S74) at the time t4 as illustrated in FIG. 8. Next, at step S75, after being refreshed to the new ciphering configuration on RB2, the UE resumes to transmit messages on RB2 as illustrated in FIG. 7 at the time t5 as illustrated in FIG. 8.

In the present embodiment, the UTRAN can change to the new ciphering configuration, either after transmitting the RRC re-configuration changing message containing ciphering configuration information (step S74) as illustrated in FIG. 7 at the time t2 as illustrated in FIG. 8. Detail operations of above will be discussed below. As such, the UE and the UTRAN are capable of communicating with each other consistent with the new ciphering configuration, e.g., encrypting/decrypting according to a cipher instructed by an information element (IE) of ciphering configuration information contained in the ciphering configuration information to decrease the system transmission failure rate and the call-dropping probability thereof.

It should be noted that the above exemplarily embodiments illustrates a preferred scheme according to the present invention, while the steps of S71 through S75 are not limited thereto as such. For example, those of ordinary skill in the art may also learn from the above description that synchronization between the UE and the UTRAN can also be obtained by the UTRAN (for example step of S74) to change to the new ciphering configuration after performing the step S71, and then the UE performs the steps of S72, S73, and S75 in that order. Furthermore, that the reception of the changing configuration information by the UE is ensured to avoid the failure of UE to receive the ciphering configuration information due to the environmental factor, and those of ordinary skill in the art can also design the UTRAN to wait until the UE feeds back an RLC acknowledgement message and thereafter changes to the new ciphering configuration.

Consider the case that measurement report sending during SRNS Relocation procedure. Another embodiment of the present invention will be described below with reference to FIGS. 9 and 10.

Figure 9:
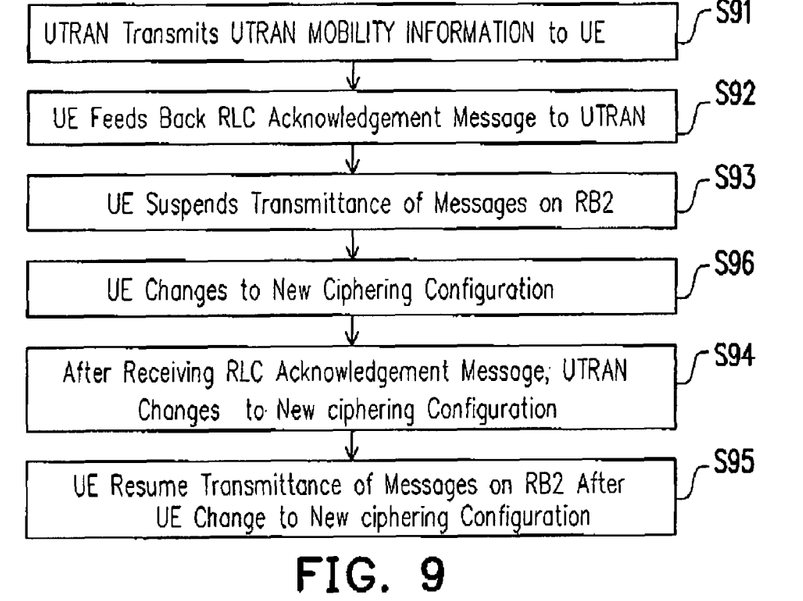
FIG. 9 is a flow chart for illustrating a synchronization method of the communication system according to another embodiment of the present invention.
Figure 10:
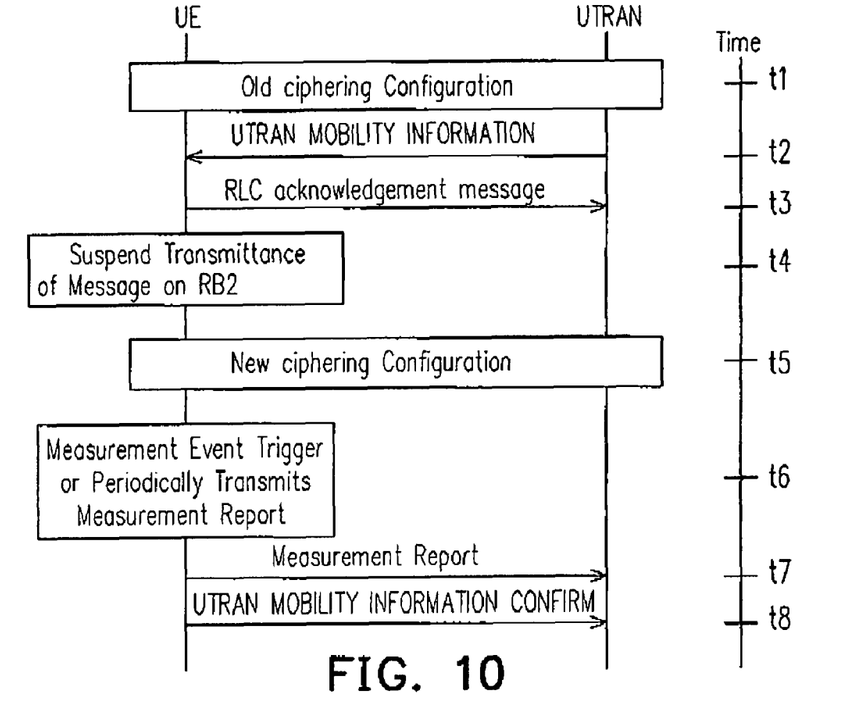
FIG. 10 is a schematic diagram for illustrating a synchronization method of the communication system according to another embodiment of the present invention.

FIG. 9 is a flow chart for illustrating a synchronization method of the communication system according to another embodiment of the present invention. FIG. 10 is a schematic diagram for illustrating a synchronization method of the communication system according to another embodiment of the present invention. Referring to FIGS. 9 and 10, at time t1 as shown in FIG. 10, the user device (e.g. UE in 3G system) and the wireless network (e.g. UTRAN in 3G system) communicate under an old ciphering configuration. Next, at the time t2 in FIG. 10, the UTRAN performs the step of S91 to transmit ciphering configuration information (e.g. UTRAN MOBILITY INFORMATION massage in 3G system) to the UE. Assume the UTRAN MOBILITY INFORMATION massage includes the IE "downlink counter synchronization information" for triggering a system relocation (e.g. SRNS Relocation in 3G system) procedure and IE "Ciphering Mode Info" to set up new ciphering configuration. After the UE receives the UTRAN MOBILITY INFORMATION massage, the UE performs the step S92 to feed back a RLC acknowledgement message to the UTRAN at time of t3 in FIG. 10. Next, at time t4 in FIG. 10, the UE performs the step of S93 to suspend transmission of the electronic information on radio bearer (RB2). If a measurement event is triggered or periodical reporting is generated at time t4, then the transmission of MEASUREMENT REPORT message is suspended. At step S96, the UE changes to a new ciphering configuration according to the UTRAN MOBILIFY INFORMATION message at time t5. Next, at step S94 and at time t5, the UTRAN changes to the new ciphering configuration after receiving the RLC acknowledgement message. Finally, the UE performs the step S95 to resume transmission of the messages on RB2. In this mariner, the UE and the UTRAN need not use unsynchronized ciphering configuration, which usually causes data ciphering/deciphering errors.

In other embodiment of the present invention, the UE receives a RRC re-configuration message (e.g. UTRAN MOBILITY INFORMATION, CELL UPDATE CONFIRM, RADIO BEARER SETUP, RADIO BEARER RECONFIGURATION, RADIO BEARER RELEASE, TRAFFIC CHANNEL RECONFIGURATION, or PHYSICAL CHANNEL RECONFIGURATION) which triggers a SRNS Relocation. If the RRC re-configuration message includes IE "Ciphering Mode Info", the UE re-establishes radio link control (RLC) entity of a radio bearer (RB2) with a new hyper frame number (HFN) corresponding to the new ciphering configuration, and applies new ciphering configuration immediately for any RB2 RLC PDU transmission/reception after RLC re-establishment. Consider the UTRAN, the UTRAN transmits the RRC re-configuration message which triggers SRNS Relocation. The UTRAN re-establishes RB2 RLC with new HFN and applies new ciphering configuration immediately for any RB2 RLC PDU transmission/reception after RLC re-establishment. In other embodiment of the present invention, if the RRC re-configuration message includes IE "Ciphering Mode Info", the UE is prohibited to transmit any RRC message on RB2 except RRC re-configuration response message (e.g. UTRAN MOBILITY INFORMATION CONFIRM, RADIO BEARER SETUP COMPLETE, RADIO BEARER RECONFIGURATION COMPLETE, RADIO BEARER RELEASE COMPLETE, TRAFFIC CHANNEL RECONFIGURATION COMPLETE, or PHYSICAL CHANNEL RECONFIGURATION COMPLETE). Next, data corresponding to the new ciphering configuration are used for ciphering/deciphering, and therefore information of the re-established RLC entity, e.g., PDU, is accordingly transmitted/received. Detail operations of the UTRAN (UE) of re-establishing to the new ciphering configuration can be well understood by those of ordinary skill in the art, and they are not iterated herein.

Referring to FIGS. 9 and 10, after the UE and the UTRAN are refreshed to the new ciphering configuration, for example at the time t5 as illustrated in FIG. 10, the UE transmits a MEASUREMENT REPORT for predetermined times to the UTRAN according to the measurement event or the standard at the time t6 as illustrated in FIG. 10. Therefore, the UE resumes sending the electronic information, e.g., feeds back the MEASUREMENT REPORT using the new ciphering configuration to the UTRAN at the time t7 as illustrated in FIG. 10. Ciphering/deciphering function is performed in RLC layer so a RRC message is received and checked after RLC deciphering. In this case, UTRAN RLC uses the new ciphering configuration to decipher the received RLC PDUs containing a RRC message. Finally, at the time t8 as illustrated in FIG. 10, the UE feeds back a response message to the UTRAN according to the standard. Such response message may vary in correspondence to the ciphering configuration information received by the UE at t2. For example, if the UTRAN at t2 transmits a UTRAN MOBILITY INFORMATION message, that is an RRC re-configuration message containing the downlink counter synchronization information to the UE, the UE feeds back a UTRAN MOBILITY INFORMATION CONFIRM message at the t8 as illustrated in FIG. 10. There are many kinds of RRC response message that are well known to those of ordinary skill in the related art, and are not to be iterated herein.

Figure 11:
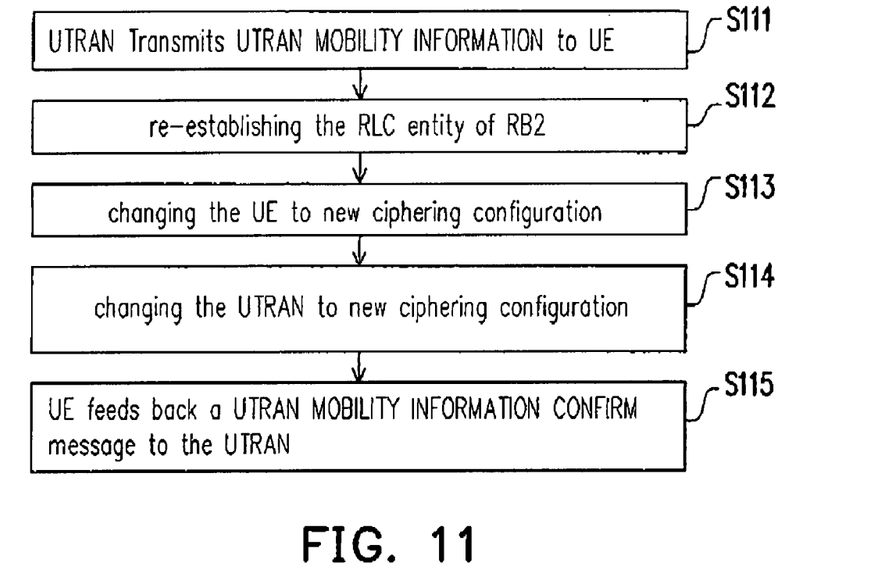
FIG. 11 is a flow chart for illustrating a synchronization method of the communication system according to another embodiment of the present invention.
Figure 12:
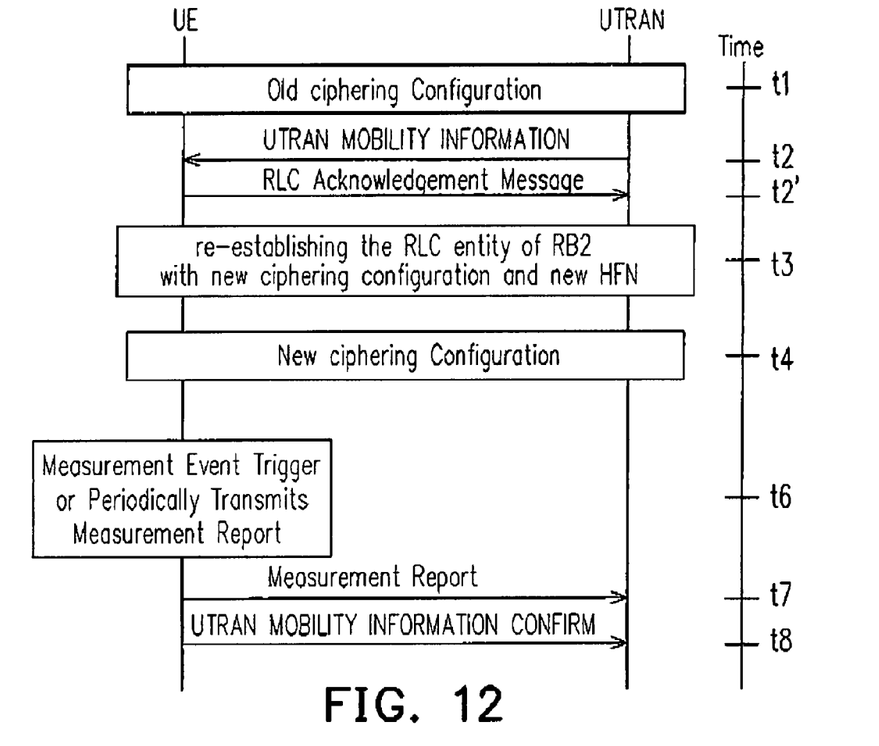
FIG. 12 is a schematic diagram for illustrating a synchronization method of the communication system according to another embodiment of the present invention.

Another embodiment of the present invention will be described below with reference to FIG. 11 and 12. FIG. 11 is a flow chart for illustrating a synchronization method of the communication system according to another embodiment of the present invention. FIG. 12 is a schematic diagram for illustrating a synchronization method of the communication system according to another embodiment of the present invention.

Referring to FIGS. 11 and 12, at time t1 as shown In FIG. 12, the user device (e.g. UE in 3G system) and the wireless network (e.g. UTRAN in 3G system) communicate under an old ciphering configuration. Next, at the time t2 in FIG. 12, the UTRAN performs the step of S111 to transmit a configuration changing information (e.g. UTRAN MOBILITY INFORMATION massage in 3G system) to the UE. At time t2', the UE feeds back a RLC acknowledgement message to the UTRAN in FIG. 12. At time of t3 in FIG. 12, the UE and the UTRAN perform the step S112 for re-establishing the radio link control (RLC) entity of radio bearer (RB2) with new ciphering configuration and new HFN. Therefore, the UE changes to the new ciphering configuration immediately following the re-establishment of RLC entity according to the UTRAN MOBILITY INFORMATION massage (step S113) at time t4 in FIG. 12. The UTRAN also changes to the new ciphering configuration (step S114) at time t4 in FIG. 12.

Finally, the UE feeds back a UTRAN MOBILITY INFORMATION CONFIRM message to the UTRAN (step S115) at time t8 in FIG. 12.

In an embodiment of the present invention, the step of re-establishing the RLC entity of RB2 of the UTRAN (UE) with a new hyper frame number (HFN) corresponding to the new ciphering configuration. Next, data corresponding to the new ciphering configuration are used for enciphering/deciphering, and therefore information of the re-establishment RLC entity, e.g., PDU, is accordingly transmitted/received. Detail operations of the UTRAN (UE) of refreshing to the new ciphering configuration can refer to previous embodiments, or can be well understood by those of ordinary skill in the art, and they are not iterated herein.

After the UE and the UTRAN are refreshed to the new ciphering configuration, the UE transmits a measurement report for predetermined times to the UTRAN according to the measurement event or the standard at the time t6 as illustrated in FIG. 12. Therefore, the UE feeds back measurement information, e.g., the MEASUREMENT REPORT message, to the UTRAN at the time t7 as illustrated in FIG. 12. Finally, at the time t8 as illustrated in FIG. 12, the UE feeds back a response message to the UTRAN according to the standard. Such a response message may vary in correspondence to the ciphering configuration information received by the UE at t2. For example, if the UTRAN at t2 transmits a UTRAN MOBILITY INFORMATION message, that is an RRC re-configuration message containing the downlink counter synchronization information to the UE, the UE feeds back a UTRAN MOBILITY INFORMATION CONFIRM message at the t8 as illustrated in FIG. 12. There are many kinds of response information that are well known to those of ordinary skill in the related art, and are not to be iterated herein.

In summary, according to the embodiments of the present invention, as the UE receives a ciphering configuration information, the UE suspends transmission of the electronic information on RB2. The UE and the UTRAN change to a new ciphering configuration according to the received ciphering configuration information. After changing to the new ciphering configuration, the UE resumes transmittance of electronic information. In this manner, the UE and the UTRAN are guaranteed, in an SRNS relocation procedure, to synchronously transmit data with a same ciphering configuration. Thus, data enciphering/deciphering errors are effectively avoided to reduce failure of transmission of electronic information, and decrease the call-dropping probability thereof.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A synchronization method for a communication system, the communication system comprising a user device and a wireless network, the synchronization method comprising:

transmitting a RRC re-configuration message containing ciphering configuration information to the user device on a logical link using the wireless network;

suspending transmission of messages on the logical link using the user device after receiving the RRC re-configuration message;

changing to a new ciphering configuration according to the RRC re-configuration message using the user device;

changing to the new ciphering configuration using the wireless network;

transmitting a RRC response message to respond the RRC re-configuration message to the wireless network on the logical link using the user device; and resuming the transmission of messages on the logical link after changing to the new ciphering configuration using the user device;

wherein the transmission of messages on the logical link is resumed before the RRC response message is transmitted to the wireless network.

2. The synchronization method for a communication system according to claim 1 further comprising:

feeding back an acknowledgement message to the wireless network after receiving the RRC re-configuration message using the user device; and changing the wireless network to the new ciphering configuration after the wireless network receives the acknowledgement message.

3. The synchronization method for a communication system according to claim 1, wherein the RRC response message is transmitted to the wireless network after the user device changes to the new ciphering configuration.

4. A user device, comprising:

a receiving/transmitting unit, adapted for receiving and transmitting electronic information; and a synchronization control unit, coupled to the receiving/transmitting unit, wherein when the receiving/transmitting unit receives a RRC re-configuration message containing ciphering configuration information on a logical link from a wireless network, the synchronization control unit controls the receiving/transmitting unit to suspend transmission of messages on the logical link; the receiving/transmitting unit changes to a new ciphering configuration according to the received RRC re-configuration message; and after the receiving/transmitting unit changes to the new ciphering configuration, the synchronization control unit controls the receiving/transmitting unit to resume the transmission of messages on the logical link;

wherein the transmission of messages on the logical link is resumed before the receiving/transmitting unit transmits a RRC response message to respond the RRC re-configuration message to the wireless network on the logical link.

5. The user device according to claim 4, wherein when the receiving/transmitting unit receives the RRC re-configuration message, the receiving/transmitting unit feeds back an acknowledgement message to the wireless network.

6. The user device according to claim 4, wherein the receiving/transmitting unit transmits the RRC response message to the wireless network after the receiving/transmitting unit changes to the new ciphering configuration.

7. A communication system, comprising:

a wireless network, adapted for providing radio access service; and a user device, for receiving electronic information from the wireless network and transmitting the electronic information to the wireless network; wherein when the user device receives a RRC re-configuration message containing ciphering configuration information on a logical link from the wireless network, the user device suspends transmission of electronic information on the logical link; the user device then changes to a new ciphering configuration according to the received ciphering configuration information; the wireless network changes to the new ciphering configuration; and after the user device changing to the new ciphering configuration, the user device resumes the transmission of the electronic information on the logical link;

wherein the transmission of the electronic information on the logical link is resumed before the user device transmits a RRC response message to respond the RRC re-configuration message to the wireless network on the logical link.

8. The communication system according to claim 7, wherein when the user device receives the RRC re-configuration message, the user device feeds back an acknowledgement message to the wireless network; and after the wireless network receives the acknowledgement message, the wireless network changes to the new ciphering configuration.

9. The communication system according to claim 7, wherein the user device transmits the RRC response message to the wireless network on the logical link after the user device changing to the new ciphering configuration.

10. The synchronization meted for a communication system according to claim 2, wherein the logical link is RRC RB2; and the acknowledgement message is a RLC acknowledgement message in UMTS system.

11. The synchronization method for a communication system according to claim 1, wherein the messages to be suspended transmission include a measurement report.

12. The user device according to claim 5, wherein the logical link is RRC RB2; and the acknowledgement message is a RLC acknowledgement message in UMTS system.

13. The user device according to claim 4, wherein the messages to be suspended transmission include a measurement report.

14. The communication system according to claim 8, wherein the logical link is RRC RB2; and the acknowledgement message is a RLC acknowledgement message in UMTS system.

15. The communication system according to claim 7, wherein the electronic information to be suspended transmission includes a measurement report.

* * * * *